United States Patent
Blea et al.

(10) Patent No.: US 10,324,801 B2
(45) Date of Patent: *Jun. 18, 2019

(54) STORAGE UNIT REPLACEMENT USING POINT-IN-TIME SNAP COPY

(71) Applicant: International Business Machines Corporation, Armonk, NY (US)

(72) Inventors: Amy N. Blea, Round Rock, TX (US); David Randall Blea, Tucson, AZ (US); Gregory E. McBride, Vail, AZ (US); William J. Rooney, Hopewell Junction, NY (US); John Jay Wolfgang, Midlothian, VA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/441,119

(22) Filed: Feb. 23, 2017

(65) Prior Publication Data

US 2017/0161156 A1 Jun. 8, 2017

Related U.S. Application Data

(63) Continuation of application No. 14/158,779, filed on Jan. 18, 2014, now Pat. No. 9,619,331.

(51) Int. Cl.
*G06F 3/06* (2006.01)
*G06F 11/14* (2006.01)
(Continued)

(52) U.S. Cl.
CPC ......... *G06F 11/1446* (2013.01); *G06F 3/065* (2013.01); *G06F 3/0607* (2013.01);
(Continued)

(58) Field of Classification Search
CPC ............. G06F 11/1446; G06F 11/2053; G06F 11/1469; G06F 11/1448; G06F 11/1662;
(Continued)

(56) References Cited

U.S. PATENT DOCUMENTS 5,446,871 A 8/1995 Shomler et al.
6,145,066 A 11/2000 Atkin
(Continued)

FOREIGN PATENT DOCUMENTS

| CN | 101615133 | 12/2009 |
|---|---|---|
| EP | 1569115 | 8/2005 |
| WO | 2012147013 | 11/2012 |

OTHER PUBLICATIONS

Wikipedia, "FlashCopy", (online) retrieved from the Internet on Jul. 22, 2013, at URL>http://en.wikipedia.org/wiki/FlashCopy, Total 2 pages.

(Continued)

*Primary Examiner* — Paul Contino
(74) *Attorney, Agent, or Firm* — William K. Konrad; Konrad, Raynes, Davda and Victor LLP

(57) ABSTRACT

In one embodiment, I/O operations may be swapped from an original storage unit to a replacement storage unit in a manner which can reduce or eliminate delays caused by copying of data from the original storage unit to the replacement storage unit. A point-in-time snap copy relationship between the original storage unit and the replacement storage unit of storage locations is established and I/O operations are swapped from the original storage unit to the replacement storage unit. The I/O operations are resumed, accessing the replacement storage unit instead of the original storage unit in the input/output operations issued by the at least one host. Other aspects are described.

23 Claims, 7 Drawing Sheets

(51) Int. Cl.
G06F 11/16 (2006.01)
G06F 11/20 (2006.01)

(52) U.S. Cl.
CPC .......... G06F 3/0611 (2013.01); G06F 3/0619 (2013.01); G06F 3/0631 (2013.01); G06F 3/0683 (2013.01); G06F 11/1448 (2013.01); G06F 11/1451 (2013.01); G06F 11/1469 (2013.01); G06F 11/1662 (2013.01); G06F 11/2053 (2013.01); G06F 11/2069 (2013.01); G06F 11/2094 (2013.01); *G06F 2201/84* (2013.01)

(58) Field of Classification Search
CPC ............. G06F 11/2094; G06F 11/2069; G06F 11/1451; G06F 3/065; G06F 3/0683; G06F 3/0619; G06F 3/0607; G06F 3/0631
See application file for complete search history.

(56) References Cited

U.S. PATENT DOCUMENTS

| | | | |
|---|---|---|---|
| 6,304,980 B1 | 10/2001 | Beardsley et al. | |
| 6,671,705 B1 | 12/2003 | Duprey et al. | |
| 6,877,016 B1 | 4/2005 | Hart et al. | |
| 7,039,777 B2 | 5/2006 | Yamagami et al. | |
| 7,467,268 B2 | 12/2008 | Lindemann et al. | |
| 7,549,027 B1* | 6/2009 | McAndrews | G06F 11/1469 707/999.202 |
| 7,640,409 B1 | 12/2009 | Stafford et al. | |
| 7,650,533 B1 | 1/2010 | Saxena et al. | |
| 8,209,496 B2 | 6/2012 | Stewart | |
| 8,577,836 B2* | 11/2013 | Kopylovitz | G06F 17/303 707/609 |
| 8,689,054 B1 | 4/2014 | van der Goot | |
| 8,990,158 B2 | 3/2015 | Clayton | |
| 9,081,842 B1 | 7/2015 | Natanzon et al. | |
| 9,405,628 B2 | 8/2016 | Blea et al. | |
| 9,619,331 B2 | 4/2017 | Blea et al. | |
| 9,665,307 B1* | 5/2017 | LeCrone | G06F 3/065 |
| 10,007,600 B2* | 6/2018 | Ash | G06F 12/0873 |
| 10,108,685 B2* | 10/2018 | Amdur | G06F 16/27 |
| 2002/0016827 A1 | 7/2002 | McCabe et al. | |
| 2003/0033494 A1 | 2/2003 | Fujibayashi et al. | |
| 2004/0260899 A1 | 12/2004 | Kern et al. | |
| 2005/0081091 A1 | 4/2005 | Bartfai et al. | |
| 2005/0108304 A1 | 5/2005 | Wilson et al. | |
| 2005/0204106 A1* | 9/2005 | Testardi | G06F 11/1471 711/162 |
| 2005/0251633 A1 | 11/2005 | Micka et al. | |
| 2006/0236048 A1 | 10/2006 | Deguchi et al. | |
| 2007/0043870 A1 | 2/2007 | Ninose | |
| 2007/0192526 A1 | 8/2007 | Sharma et al. | |
| 2008/0022058 A1 | 1/2008 | Nadathur et al. | |
| 2008/0065843 A1 | 3/2008 | Bartfai et al. | |
| 2008/0320219 A1* | 12/2008 | Okada | G06F 11/2074 711/114 |
| 2009/0006794 A1 | 1/2009 | Mizuta et al. | |
| 2009/0019096 A1 | 1/2009 | Kern et al. | |
| 2010/0057789 A1* | 3/2010 | Kawaguchi | G06F 11/1456 707/E17.005 |
| 2010/0169253 A1 | 7/2010 | Tan | |
| 2010/0180093 A1 | 7/2010 | Huber et al. | |
| 2011/0093862 A1 | 4/2011 | Doatmas et al. | |
| 2011/0099360 A1 | 4/2011 | Bashir et al. | |
| 2011/0219192 A1 | 9/2011 | Hutchison et al. | |
| 2011/0264878 A1 | 10/2011 | Blea et al. | |
| 2012/0221790 A1* | 8/2012 | Nunez | G06F 3/0617 711/114 |
| 2012/0259810 A1* | 10/2012 | Kopylovitz | G06F 17/303 707/609 |
| 2013/0080704 A1 | 3/2013 | Brown et al. | |
| 2013/0173537 A1 | 7/2013 | Wilkinson | |
| 2014/0195483 A1 | 7/2014 | Clayton | |
| 2015/0154274 A1 | 6/2015 | Clayton | |
| 2016/0313935 A1 | 10/2016 | Blea et al. | |
| 2018/0095870 A1* | 4/2018 | Ash | G06F 12/0873 |

OTHER PUBLICATIONS

Wikipedia, "IBM Global Mirror", (online), retrieved from the Internet on Jul. 22, 2013, at URL>http://en.wikipedia.org/wiki/Global_Mirror, Total 2 pages.
Wikipedia, "Peer to Peer Remote Copy", (online) retrieved from the Internet on Jul. 22, 2013, at URL>http://en.wikipedia.org/wiki/Metro_Mirror, Total 1 page.
Brooks, C., et al, "IBM System Storage Business Continuity Solutions Overview", dated Feb. 2007, International Technical Support Organization, IBM System Storage Business Continuity Solutions Overview, Total 190 pages.
Wikipedia, "Snapshot (computer storage)", (online) retrieved from the Internet on Jul. 22, 2013, at URL>http://en.wikipedia.org/wiki/Snapshot_(computer_storage), Total 14 pages.
Rooney, W. J., et al., "IBM TotalStorage Productivity Center for Replication for z/OS", dated 2008, IBM System Journal, vol. 47, No. 4, Total 14 pages.
IBM, "GDPS: The e-business Availability Solution", dated Mar. 2005, IBM Executive Summary, Total 30 pages.
M. Banikazemi, et al.,"Storage-Based Intrusion Detection for Storage Area Networks (SANs)" dated 2005. Thomas J. Watson Research Center IBM Research, Proceedings of the 22nd IEEE/13th NASA Goddard Conference on Mass Storage Systems and Technologies (MSST 2005), Total 10 pages.
IBM, "IBM HyperSwap Technology", IBM Advanced Technology Support, Americas, dated Jul. 28, 2008, Total 18 pages.
IBM, "z/os Basic HyperSwap", dated Apr. 2008, IBM Systems Storage, Total 23 pages.
US Patent Application, dated Sep. 23, 2013 for U.S. Appl. No. 14/034,518, filed Sep. 23, 2013, invented by Amy N. Blea et al., Total 48 pages.
Office Action, dated Nov. 4, 2015, for U.S. Appl. No. 14/034,518, filed Sep. 23, 2013, invented by Amy N. Blea et al., Total 15 pages.
Response to Office Action, dated Feb. 4, 2016, for U.S. Appl. No. 14/034,518, filed Sep. 23, 2013, invented by Amy N. Blea et al., Total 12 pages.
Notice of Allowance, dated Mar. 29, 2016, for U.S. Appl. No. 14/034,518, filed Sep. 23, 2013, invented by Amy N. Blea et al., Total 14 pages.
US Patent Application, dated Jun. 29, 2016, for U.S. Appl. No. 15/197,612, filed Jan. 18, 2014, invented by David R. Blea et al., Total 48 pages.
US Patent Application, dated Jan. 18, 2014, for U.S. Appl. No. 14/158,779, filed Jan. 18, 2014, invented by David R. Blea et al., Total 49 pages.
Office Action, dated Feb. 16, 2016, for U.S. Appl. No. 14/158,779, filed Jan. 18, 2014, invented by David R. Blea et al., Total 31 pages.
Response to Office Action, dated May 16, 2016, for U.S. Appl. No. 14/158,779, filed Jan. 18, 2014, invented by David R. Blea et al., Total 13 pages.
Final Office Action, dated Jun. 15, 2016, for U.S. Appl. No. 14/158,779, filed Jan. 18, 2014, invented by David R. Blea et al., Total 26 pages.
Response to Final Office Action, dated Oct. 17, 2016, for U.S. Appl. No. 14/158,779, filed Jan. 18, 2014, invented by David R. Blea et al., Total 14 pages.
Notice of Allowance, dated Dec. 2, 2013, for U.S. Appl. No. 14/158,779, filed Jan. 18, 2014, invented by David R. Blea et al., Total 9 pages.
Office Action, dated Feb. 24, 2017, for U.S. Appl. No. 15/197,612, filed Jan. 18, 2014, invented by David R. Blea et al., Total 22 pages.
Response to Office Action, dated May 24, 2017, for U.S. Appl. No. 15/197,612, filed Jan. 18, 2014, invented by David R. Blea et al., Total 13 pages.
Office Action, dated Oct. 13, 2017, for U.S. Appl. No. 15/197,612, filed Jan. 18, 2014, invented by David R. Blea et al., Total 24 pages.

(56) References Cited

OTHER PUBLICATIONS

Response to Office Action, dated Jan. 16, 2018, for U.S. Appl. No. 15/197,612, filed Jan. 18, 2014, invented by David R. Blea et al., Total 13 pages.

* cited by examiner

STORAGE UNIT REPLACEMENT USING POINT-IN-TIME SNAP COPY

BACKGROUND

1. Field of the Invention

The present invention relates to a method, system, and program for replacing a storage unit using, in one embodiment, point-in-time snap copy and a storage unit swap.

2. Description of Related Art

One or more hosts may store large quantities of data in a group of storage units, which is typically controlled by a storage controller. Examples of such a storage controllers include the IBM TotalStorage® Enterprise Storage Server® (ESS) and the IBM System Storage DS8000 series. A storage controller such as the ESS or DS8000 may provide a number of functions accessible by the hosts for protecting data, backing the data up, and making the data available for use.

Amongst the functions which may be provided by a storage controller is a data preservation function which can preserve an identified set of data at a particular point in time. For example, the ESS and DS8000 series storage controllers support a point-in-time snap copy function referred to as "FlashCopy" which enables a copy to be made of a set of tracks in a source volume. One feature of such point-in-time snap copy functions is that the data of the copy is frequently made immediately available for read or write access. The identified data may be for example, a set of tracks which can consist of an entire volume, a data set, or just a selected set of tracks, for example.

In one mode of a point-in-time snap copy function, a copy of all of the data to be preserved at the particular point in time, is made by copying the identified data from the source volume to the target volume, typically in a background copy mode. If a host attempts to read data from the target volume before it is copied over to the target volume, the read operation is directed to the source volume containing the original data. If a host attempts to update the data on the source volume which is being preserved on the target volume, that update is typically temporarily delayed until the old data to be updated is copied to the target volume for preservation. Once a particular data location of the set of identified data on the source volume has been successfully copied to the target volume by the background copy operation, that data location on the source volume is freed for subsequent immediate updating by a host.

Storage controllers can also provide continuous availability of production data in the event of a sudden catastrophic failure at a single point in time or data loss over a period of time. In one such disaster recovery system, production data is replicated from a local site to a remote which may be separated geographically by several miles from the local site. Such dual, mirror or shadow copies are typically made in a secondary storage device at the remote site, as the application system is writing new data to a primary storage device usually located at the local site. Different data replication technologies may be used for maintaining remote copies of data at a secondary site, such as International Business Machine Corporation's ("IBM") Metro Mirror Peer to Peer Remote Copy (PPRC), Extended Remote Copy (XRC), Coupled XRC (CXRC), Global Copy, and Global Mirror Copy.

In data mirroring systems, data is typically maintained in volume pairs, comprising a primary volume in a primary storage device and a corresponding secondary volume in a secondary storage device that includes an identical copy of the data maintained in the primary volume. The primary and secondary volumes are identified by a copy relationship in which the data of the primary volume, also referred to as the source volume, is copied to the secondary volume, also referred to as the target volume. Primary and secondary storage controllers may be used to control access to the primary and secondary storage devices.

Tivoli Storage Productivity Center for Replication is an example of an application that customers may use to manage planned and unplanned outages. The Tivoli Storage Productivity Center for Replication application can detect failures at the primary storage subsystem which may be at a local site, for example. Such failures may include a problem writing or accessing primary storage volumes at the local site. When the Tivoli Storage Productivity Center for Replication recovery application detects that a failure has occurred, it can invoke or cause to be invoked a storage unit swapping function, an example of which is the IBM HyperSwap® function. This function may be used to automatically swap processing for all volumes in the mirrored configuration from the local site to the remote site. As a consequence of the swap, the storage volumes at the remote site which were originally configured as the secondary volumes of the original copy relationship, are reconfigured as the primary volumes of a new copy relationship. Similarly, the storage volumes at the local site which were originally configured as the primary volumes of the original copy relationship, may be reconfigured as the secondary volumes of the new copy relationship, once the volumes at the local site are operational again. In anticipation of an unplanned swap, information may be passed by the Tivoli Storage Productivity Center for Replication application to the HyperSwap function which can detect a failure on its own (i.e. without further assistance from Tivoli Storage Productivity Center for Replication application) and perform the HyperSwap function.

In various situations, it may be appropriate to switch input/output (I/O) operations directed to one or more volumes of a data storage to corresponding volumes of the same or a different source storage without impacting the users' I/O production work. Various products are available for migrating data from an existing storage subsystem to a new storage subsystem with little or no disruption to ongoing input/output (I/O) operations or to a disaster recovery capability which may be provided in case of a failure over the course of the data migration. Examples of such data migration products include TDMF (Transparent Data Migration Facility) by IBM Corporation or FDRPAS by Innovation Data Processing.

SUMMARY

Provided are a method, system, and program for storage unit replacement including writing updates to storage locations of an original storage unit in response to received input/output operations, creating a point-in-time snap copy of the original storage unit as a replacement storage unit of storage locations, initiating writing updates to storage locations of the replacement storage unit instead of to storage locations of the original storage unit, in response to received input/output operations. In one embodiment data may be copied in a background operation, for example, from storage locations of the original storage unit to storage locations of the replacement storage unit after initiation of the writing of updates to storage locations of the replacement storage units instead of to storage locations of the original storage units. It is appreciated that in some embodiments, background copying may be fully or partially bypassed such as if the replacement storage unit is used as an intermediate copy which is in turn copied to yet another replacement storage unit such as a tape volume, for example. Once the copying to the ultimate storage volume is completed, the contents of the intermediate storage unit need not be completed or maintained.

In another aspect, a swapping function is utilized comprising swapping the replacement storage unit for the original storage unit wherein the swapping includes quiescing input/output operations to the original storage unit.

In another aspect, the swapping includes a swap manager maintaining a data structure identifying a storage unit to be accessed by the input/output operations issued by at least one host to write updates to storage locations of the identified storage unit, wherein the swapping includes the swap manager modifying a data structure to identify the replacement storage unit instead of the original storage unit to be accessed by the input/output operations issued by the at least one host so that updates are written to storage locations of the replacement storage unit instead of to storage locations of the original storage unit, in response to received input/output operations. Other embodiments, aspects and features are described herein.

DETAILED DESCRIPTION

Figure 1:
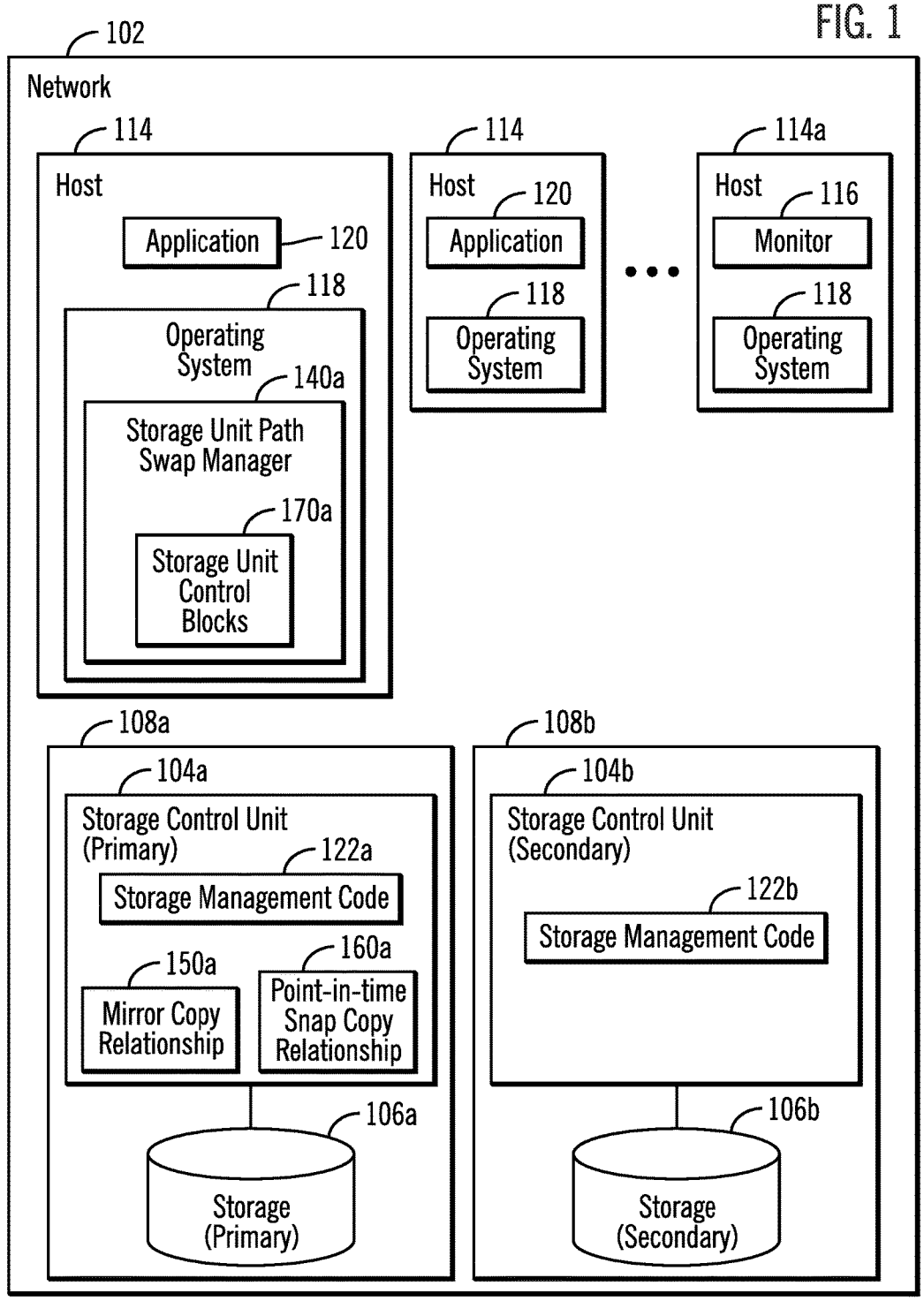
FIG. 1 illustrates an example of a network computing environment, employing storage unit replacement in accordance with one embodiment of the present description.

FIG. 1 illustrates an embodiment of a network computing environment having input/output (I/O) operations issued by at least one host to access storage locations of a designated original storage unit, for reading data from and writing updates to the storage locations of the designated original storage unit. It is appreciated that situations arise in which it may be appropriate to switch one or more volumes being accessed in I/O operations to corresponding volumes which, in one embodiment may be within the same storage system or subsystem. It is appreciated that in other embodiments, I/O operations may be switched to a volume in a storage system or subsystem outside that of the original volume. In accordance with one embodiment of the present description, the I/O operations may be swapped from the original storage unit to a replacement storage unit in a manner which can reduce or eliminate delays caused by copying of data from the original storage unit to the replacement storage unit before the swap of I/O operations can occur. It is appreciated that other features may be realized instead of or in addition to those described herein, depending upon the particular application.

In one embodiment, the access of the input/output operations to the original storage unit is quiesced, and a point-in-time snap copy relationship between the original storage unit and the replacement storage unit of storage locations is established. The designated storage unit of the I/O operations may then be swapped from the original storage unit to the replacement storage unit in a storage unit swap, so that the replacement storage unit of storage locations is designated to be accessed by the input/output operations issued by at least one host, instead of the original storage unit. The I/O operations may then be resumed, accessing the replacement storage unit instead of the original storage unit in the input/output operations issued by the at least one host, and thus writing updates to the storage locations of the designated replacement storage unit instead of the original storage unit.

It is believed that storage management in accordance with the present description can achieve swapping of I/O operations from accessing an original storage unit, to accessing a replacement storage unit in a manner having little or no disruption to ongoing I/O operations. Moreover, it is believed that such a swap may be achieved relatively quickly with little or no delay caused by data copying prior to the swap. For example, data copying form the original storage unit to the replacement storage unit may be performed in a background operation after the swap. Other features and advantages may be realized, depending upon the particular application.

Although the embodiment of FIG. 1 is described in connection with a mirror relationship, it is believed that aspects of the present description are applicable to other types of copy relationships, depending upon the particular application. Additional features are discussed in the present description. It is appreciated that still other features may be realized instead of or in addition to those discussed herein, depending upon the particular application.

In the illustrated embodiment, a copy relationship identifies a source storage location, such as a primary storage location, and a target storage location, such as a secondary storage location, in which data stored at the source storage location is to be mirrored or otherwise copied to the target storage location. Thus, as used herein, a primary storage location and a secondary storage location are storage locations related by a copy relationship.

Furthermore, as used herein, the term "storage location" refers to a storage location containing one or more units of data storage such as one or more volumes, cylinders, tracks, segments, extents, or any portion thereof, or other unit or units of data suitable for transfer. Thus, a source storage location and the associated target storage location may each be a storage volume, wherein the volumes are typically at different devices or sites. However, it is appreciated that a source storage location and a target storage location may each be of a size other than a volume, for example.

In the illustrated embodiment, a network 102 includes storage control units or storage controllers 104*a*, 104*b*, and data storages 106*a*, 106*b*. The storage control unit 104*a* and its associated data storage 106a provide a storage subsystem 108a. Similarly, the storage control unit 104b and its associated data storage 106b provide a storage subsystem 108b. The storage control units 104a, 104b, manage the copying of updates from a primary storage subsystem to a secondary storage subsystem. In the configuration illustrated in FIG. 1, the storage control unit 104a and the data storage 106a have been configured as a primary storage control unit and the primary storage, respectively. Similarly, the storage control unit 104b and its data storage 106b have been configured as a secondary storage control unit and a secondary storage, respectively. Hence, in the configuration depicted in FIG. 2, the storage control unit 104a will be referred to as a primary storage control unit 104a and the data storage 106a will be referred to as a primary storage 106a. Similarly, the storage control unit 104b will be referred to as a secondary storage control unit 104b and the data storage 106b will be referred to as a secondary data storage 106b. As explained in greater detail below, the storage control units and storages may be reconfigured to change the associated primary and secondary roles within a copy relationship.

The network 102 further includes one or more hosts 114 writing updates to the primary storage 106a. At least one such host 114, such as the host 114a, has in this embodiment, storage management functions including a monitor program 116 monitoring failures in the availability of the primary storage control unit 104a. In some embodiments, the monitor program 116 may be operated in a device apart from the hosts. The components 104a, 104b, 106a, 106b, and 114 are connected to the network 102 and the network 102 enables communication among these components. The network 102 may include one or more switches to provide one or more paths of communication between the different network 102 elements.

The primary storage control unit 104a is located at a first site and the secondary storage control unit 104b is located at a second site which may be geographically or functionally remote from the first site. Thus, in this example, the first site may be at a local site and the second site may be at a geographically remote site separated by a short or long geographical distance from the local site. Alternatively, the local and remote sites may be relatively close such as in different buildings in the same general geographical location, in different rooms of the same building, in different machines in the same room, or in different portions or partitions of the same machine, of the network 102. For example, the primary and secondary storage control units may be two logical storage control units of the same physical control unit.

A typical host 114 includes an operating system 118 and an application 120 that writes updates to the primary 106a or secondary 106b storage. The host 114a which includes the monitor program 116 may omit the update writing applications 120 in some embodiments. The primary 104a and secondary 104b storage control units include storage management software 122a and 122b to manage data copying operations including data mirroring operations.

The monitor program 116 may monitor the primary storage control unit 104a and upon detecting a failure event, may utilize a storage unit swap manager 140a of an operating system 118 of a host 114, to cause a failover operation to cause updates from the host 114 to be sent to the secondary storage control unit 104b instead of to the primary storage control unit 104a. If the storage 106a fails while updates to the primary storage 106a are being applied to the storage 106b, then the updates that did not complete being mirrored to the storage 106b can be recovered and applied to the storage 106b.

In the illustrated embodiment, the storage unit swap manager 140a provides a storage unit swap function. As explained in greater detail below, a multi-storage volume swap function such as the IBM HyperSwap® may be modified in accordance with the present description to facilitate a swap operation in connection with a storage unit used in I/O operations. Although the storage unit swap manager 140a is a part of the operating system 118 of one or more hosts 114 in the illustrated embodiment, it is appreciated that a storage unit swap manager may be implemented in application software of a host, or in the operating system or application software of a storage control unit, for example.

Figure 2A:
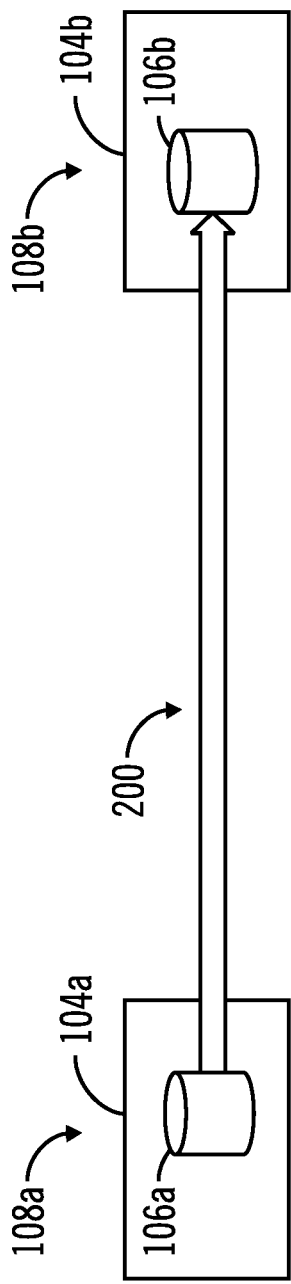
FIG. 2*a* illustrates an example of a mirror operation of the network computer environment of FIG. 1.

The storage management code 122a, 122b is invoked to establish a copy relationship such as mirror copy relationship 150a, between first and second storage locations in a first storage subsystem and second storage subsystem, respectively. The storage control units 104a, 104b may comprise enterprise storage servers, such as the IBM DS8000 series, for example. In the illustrated embodiment, the copy relationship 150a comprises a peer-to-peer mirror relationship for a pair of storage locations in which updates to the primary storage locations of the mirror relationship 150a are mirrored to the secondary storage locations of the mirror relationship 150a. It is appreciated that other types of copy relationships may be established, depending upon the particular application. FIG. 2a depicts an example of a mirror operation 200 mirroring data from storage units of the storage 106a of the original source storage subsystem 108a to storage units of the storage 106b of the original target storage subsystem 108b, in copy relationships such as the copy relationship 150a of FIG. 1, with associated storage units of the original source storage subsystem 108a.

The storage management code 122a, 122b managing the first copy relationship 150a may be implemented using synchronous copy operations, such as a peer-to-peer remote copy (PPRC) program. An example of a PPRC program is the IBM Tivoli Storage Productivity Center for Replication copy program that enables the copying of updates to the primary storage 106a, to the secondary storage 106b. The storage management code 122a, 122b, may also implement synchronous or asynchronous remote copy operations where updates to the primary 106a or secondary 106b storage are mirrored to a corresponding location in at a remote site. The described operations may be implemented with other programs such as other copy programs or other global recovery programs.

Figure 2B:
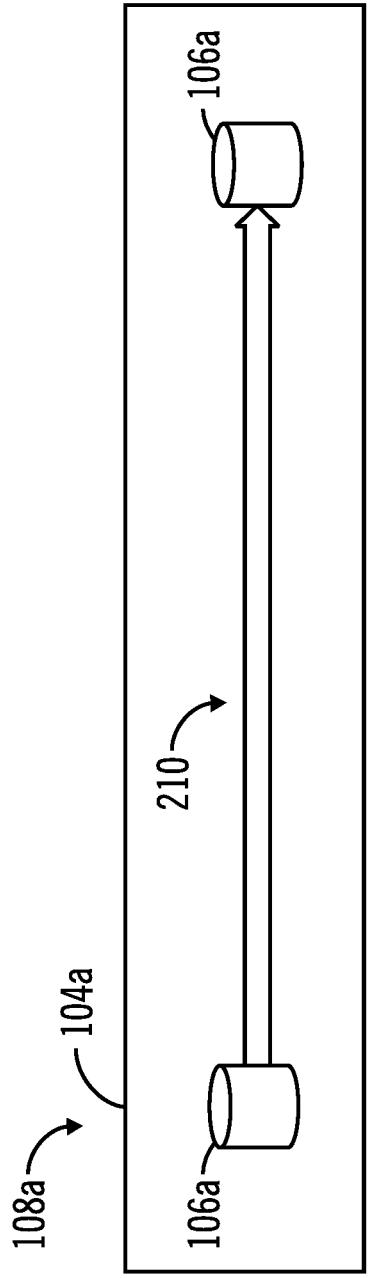
FIG. 2*b* illustrates an example of a point-in-time snap copy operation of the network computer environment of FIG. 1.

In accordance with the present description, the storage management code such as the storage management code 122a may also be invoked by the multi-storage volume swap manager 140a to establish a point-in-time snap copy relationship such as the second copy relationship 160a (FIG. 1), between first and second storage locations in one or more storage systems or subsystems. FIG. 2b depicts an example of a point-in-time snap copy operation 210 copying data from a first set of storage units of the storage 106a of the original source storage subsystem 108a to a second set of storage units of the storage 106a of the original source storage subsystem 108b, in copy relationships such as the copy relationship 160a of FIG. 1, with associated storage units of the original source storage subsystem 108a.

As previously mentioned, a point-in-time snap copy relationship between an original storage unit and a replacement storage unit of storage locations may be established to facilitate a swap of the designated storage unit of I/O operations from the original storage unit to the replacement storage unit in a storage unit swap. In the illustrated embodiment, the multi-storage volume swap manager 140*a* may designate the replacement storage unit to be accessed by the input/output operations issued by at least one host, instead of the original storage unit. The I/O operations may then be resumed, accessing the replacement storage unit instead of the original storage unit in the input/output operations issued by the at least one host, and thus writing updates to the storage locations of the designated replacement storage unit instead of the original storage unit. Hence, in some embodiments, swapping of a replacement storage unit and an original storage unit may be performed by a manager in a manner which is transparent to the host application issuing input/output operations. Thus, in such embodiments, the host application need not designate the replacement storage unit to be accessed by its input/output operations instead of the original storage unit. Although the multi-storage volume swap manager 140*a* is depicted as part of the operations of a host, it is appreciated that in some embodiments, designation of the replacement storage unit to be accessed by the input/output operations issued by at least one host, instead of the original storage unit, may be performed by a storage control unit. In another embodiment, designation of the replacement storage unit to be accessed by the input/output operations issued by at least one host, instead of the original storage unit, may be performed by a host 114 which is not hosting the application accessing the storage 106*a* or 106*b*, for example.

In accordance with one aspect of the present description, it is believed that swapping I/O operations from the original storage unit to a replacement storage unit in this manner using a point-in-time snap copy permits the swap to take place without waiting for the data of the original source storage unit to be copied to the replacement storage unit. As a consequence, it is believed that delays caused by copying of data from the original storage unit to the replacement storage unit before the swap of I/O operations can occur, may be reduced or eliminated. It is appreciated that other features may be realized instead of or in addition to those described herein, depending upon the particular application.

The network 102 includes a fabric which may comprise a Storage Area Network (SAN), Local Area Network (LAN), Intranet, the Internet, Wide Area Network (WAN), peer-to-peer network, wireless network, arbitrated loop network, etc. The storages 106*a*, 106*b* may comprise an array of storage devices, such as a Just a Bunch of Disks (JBOD), Direct Access Storage Device (DASD), Redundant Array of Independent Disks (RAID) array, virtualization device, tape storage, flash memory, etc.

Communication paths from the storage subsystems to the hosts 114 may be based upon a particular host attachment protocol such as FICON, for example. Other communication paths of the fabric may comprise for example, a Fibre Channel arbitrated loop configuration, a serial loop architecture or a bus interface, such as a Peripheral Component Interconnect (PCI) interface such as a PCI-Express interface. The communication paths of the fabric may also be part of an Ethernet network, for example, such that each node has an individual network (internet protocol) address. Other types of communication paths may be utilized, such as a modem telephone path, wireless network, etc., depending upon the particular application.

In the illustrated embodiment, communication hardware associated with the communication paths between the nodes includes switches, routers, cables, modems, adapters, power supplies, etc. Communication software associated with the communication paths includes instructions and other software controlling communication protocols and the operation of the communication hardware in accordance with the communication protocols, if any. It is appreciated that other communication path protocols may be utilized, depending upon the particular application.

Figure 3:
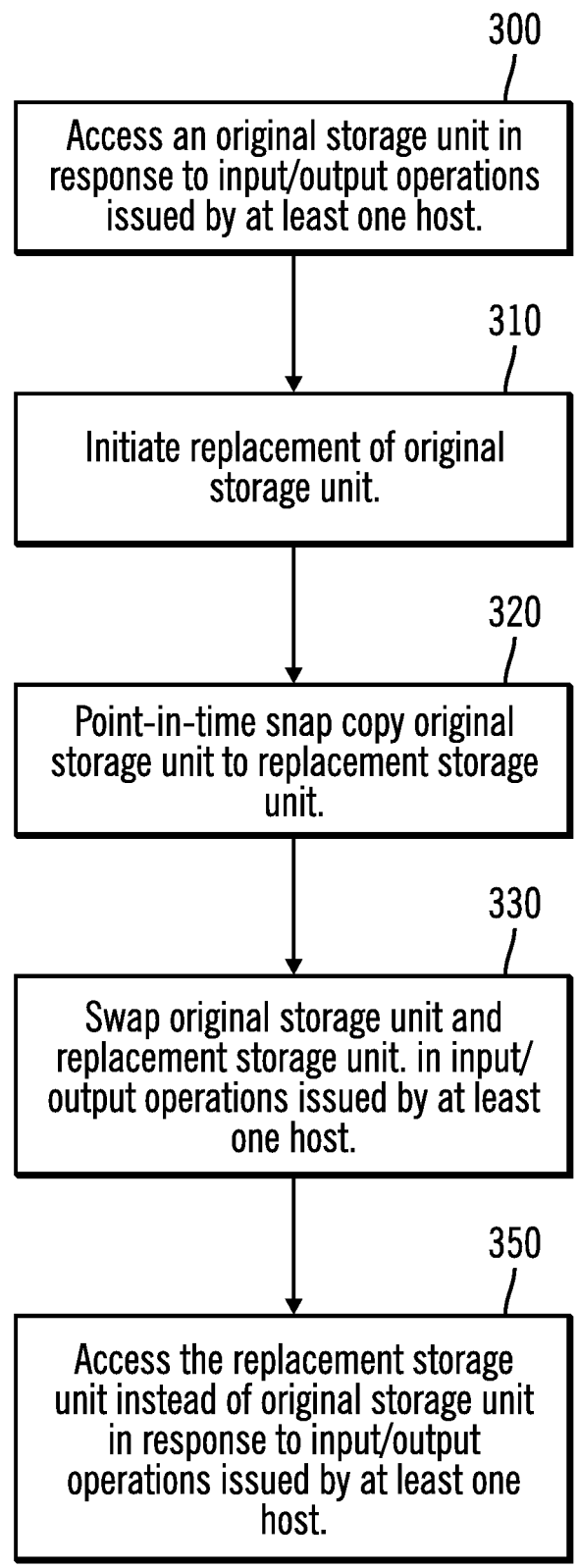
FIG. 3 illustrates an embodiment of operations to replace a storage unit using a point-in-time snap copy operation and a storage unit swap in accordance with one embodiment of the present description.

FIG. 3 illustrates one example of operations of a networked storage system in which a storage unit replacement is performed in accordance with one embodiment of the present description. It is appreciated that situations arise in which it may be appropriate to switch one or more volumes being accessed in I/O operations to corresponding volumes within the same storage system or subsystem. For example, some storage controllers may have limitations as to the number of copy paths a target storage unit and a source storage unit are permitted to have in a mirror or other copy relationship. In another example, there may be limitations on the number of paths from the host 114 to a storage control unit 108. Moreover, a storage control unit such as the unit 108*a* may be broken into logical control units (LCUs) which may not all have the same number of paths to and from the host 114 as the others and may also have different performance attributes (for example, faster technology, or bottlenecks in the storage area network, etc.). Thus, when a storage unit reaches such a limit, it may be appropriate to reconfigure storage to another storage unit.

It is further appreciated that errors such as media errors may cause I/O errors to be encountered. To avoid such storage caused I/O errors, it may be appropriate to move one or more volumes to different storage.

In a first operation, a storage unit such as a storage volume of an original source storage subsystem such as the storage subsystem 108*a* (FIG. 2), for example, is accessed (block 300) by a storage control unit such as the storage control unit 104*a*, in response to input/output operations issued by at least one host such as one of the hosts 114. The input operations may include read operations reading data from the original storage volume to the host, and the output operations may include write operations writing updates from the host to the original storage volume.

In one embodiment, appropriate data structures such as storage Unit Control Blocks (UCBs) 170*a* (FIG. 1) of an appropriate operating system such as z/OS, for example, may be read by a host to identify a network path to the original storage volume for the input/output operations issued by the host. It is appreciated that an original storage unit may be identified using other techniques for input/output operations and that other types of operating systems may be utilized.

In one embodiment, data stored in the original source storage unit, may be mirrored from the original source storage subsystem to an original target storage unit of an original target storage subsystem. It is appreciated that in some embodiments, mirroring may be omitted.

Software for performing a mirroring operation may include a suitable copy services management tool, such as those provided by EMC (e.g. Geographically Dispersed Disaster Restart (GDDR), Symmetrix Remote Data Facility (SRDF), and AutoSwap), Hitachi (e.g. Hitachi Universal Replicator (HUR)), or IBM (e.g. Tivoli Storage Productivity Center for Replication). Such a tool may be utilized by storage management in accordance with the present description which can facilitate a storage unit replacement as described herein.

Figure 4:
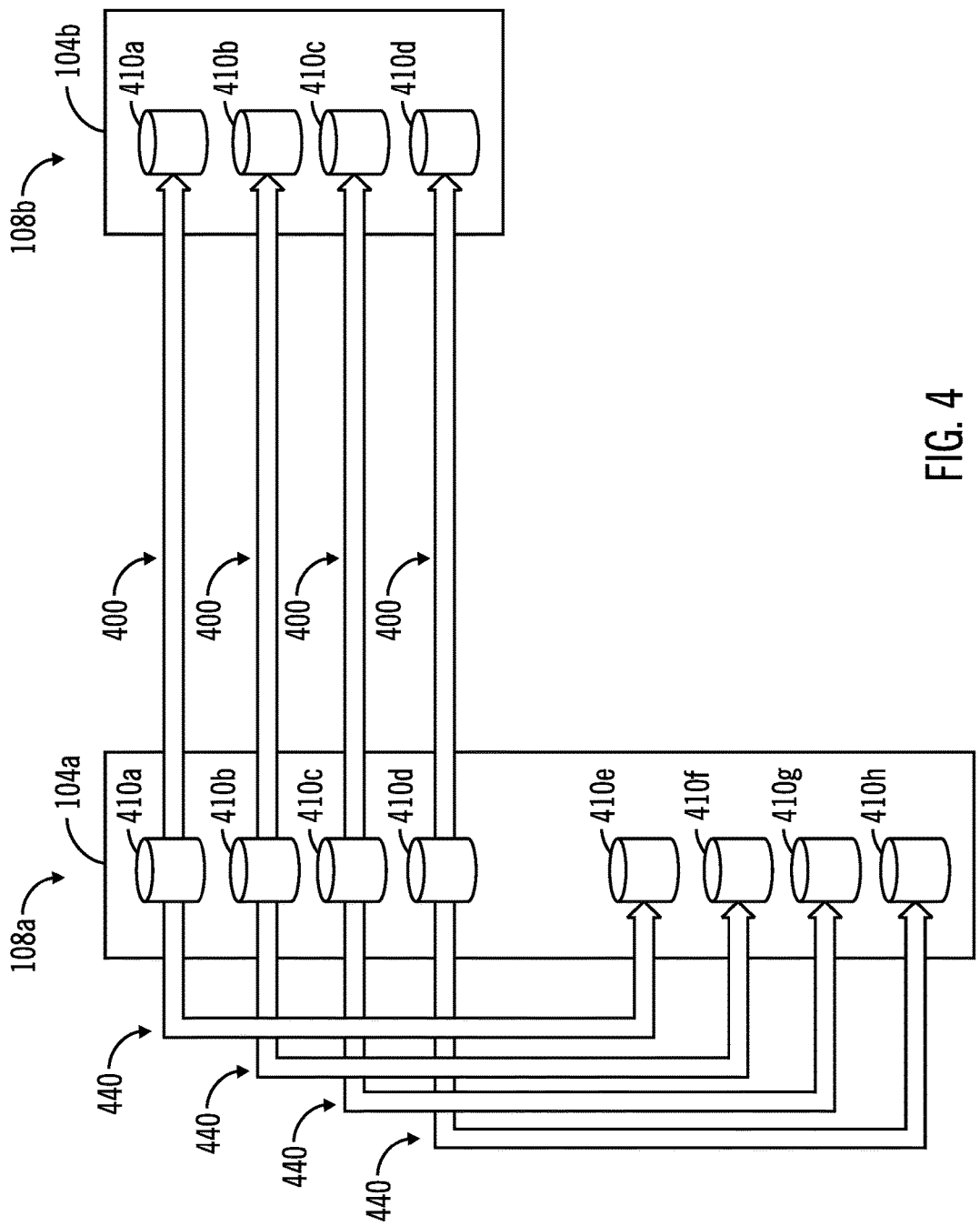
FIGS. 4 and 5 illustrate an example of a point-in-time snap copy operation and a storage unit swap in accordance with one embodiment of the present description

FIG. 4 depicts an example of a mirror operation 400 mirroring data of the storage 106*a* of the original source storage subsystem 108a to the storage 106b of the original target storage subsystem 108b. In the illustrated embodiment, the mirroring of data stored in the original source storage subsystem includes mirroring data from volumes 410a-410d of the storage 106a of the original source storage subsystem 108a to corresponding volumes 410a-410d of the storage 106b of the original target storage subsystem 108b, in copy relationships such as the copy relationship 150a of FIG. 1, with associated storage units such as volumes 410a-410d of the original source storage subsystem 108a. Thus, in this example, the mirror operation 400 copies data from a source volume 410a (a primary volume) of the storage control unit 104a of the storage subsystem 108a, to a target volume 410a (a secondary volume) of the storage control unit 104b of the storage subsystem 108b, pursuant to a copy relationship which includes the volume pair of the source volume 410a and the target volume 410a. Accordingly, any updates to the primary storage subsystem 108a are mirrored over the secondary storage subsystem 108b in response to ongoing I/O operations and the copy relationships established between the source storage subsystem 108a and the target storage subsystem 108b. FIG. 4 depicts four such copy relationship pairs. However, it is appreciated that in a mirror relationship in a typical commercial setting, such copy relationship pairs may number in the tens, hundreds, thousands or more.

In another operation, a replacement of an original storage unit be initiated (block 310, FIG. 3) that when completed, swaps a replacement storage unit for an original storage unit, so that the replacement source storage unit is accessed instead of the original source storage unit in input/output operations issued by at least one host. In the embodiment of FIG. 4, replacement source volumes 410e-410h of storage 106a of source storage subsystem 108a, may replace original source volumes 410a-410d, respectively, of storage 106a of source storage subsystem 108a.

In accordance with one aspect of the present description, the replacement operation which has been initiated (block 310) may utilize a storage unit swap function such as the IBM HyperSwap® function, which may be modified in accordance with the present description. Absent modification in accordance with the present description, the HyperSwap® function is typically performed between two volumes when there is a preexisting relationship such as a mirror relationship between the two volumes. Moreover, absent modification in accordance with the present description, the HyperSwap® function is typically performed between two volumes which are duplex volumes, that is, volumes which are full or nearly full copies or each other. As explained in greater detail below, a multi-storage volume swap function such as the IBM HyperSwap® may be modified in accordance with the present description to facilitate a storage unit swap operation (block 310) in connection with a point-in-time snap copy operation (block 320) which takes a snap copy of the data of a storage unit such as a volume, at a particular point in time. However, the actual copying of data from one volume to another usually takes place later and over time, typically in a background operation interspersed with higher priority operations. Thus, in one embodiment, in a storage unit swap function in accordance with the present description, the volume swap may occur immediately after the point-in-time snap copy relationship has been established without waiting for the actual copying of data to be completed or initiated.

In one embodiment, the point-in-time snap copy operation is between two volumes in the same storage subsystem. However, it is appreciated that in other embodiments, the point-in-time snap copy operation may be between volumes in different storage subsystems. Also, although the multi-storage volume swap manager 140a is depicted as part of the operations of a host, it is appreciated that in some embodiments, some or all of the operations swapping the replacement storage unit and the original storage unit, may be performed by a storage control unit, and vice versa. Still further, in some embodiments, the applications 120 and the monitor 116 may reside on the same host 114. In other embodiments, the applications 120 and the monitor 116 may reside on different hosts 114.

Figure 5:
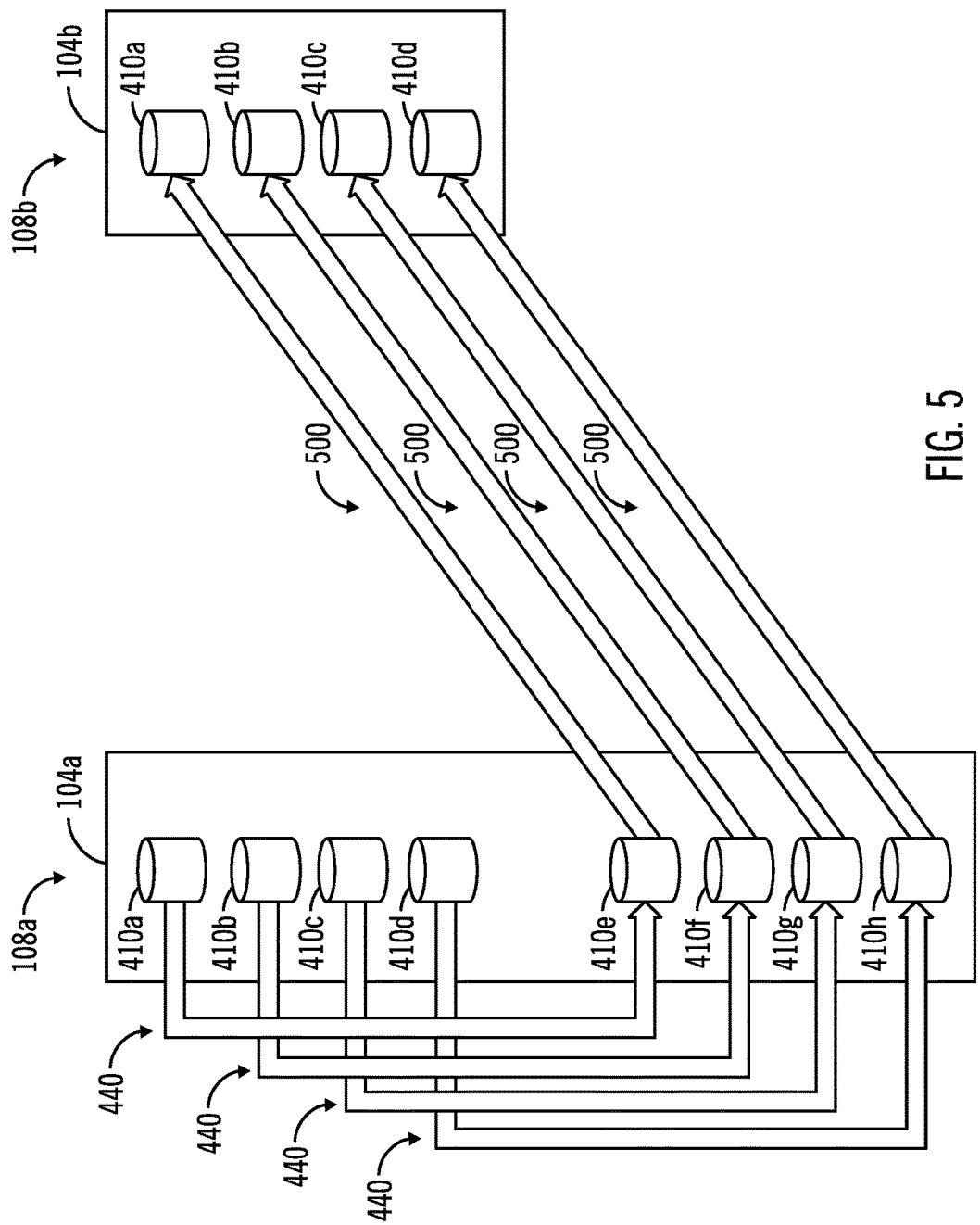

As a part of the replacement operation which has been initiated (block 310), in some embodiments, I/O operations may be temporarily quiesced to reduce or eliminate the chance of data loss in the unlikely event of a failure during the storage unit swap operation. In one embodiment, the storage unit swap function can automatically quiesce I/O operations and terminate the copy relationship pairs of the mirror operation 400 (FIG. 4) from the original source storage subsystem 108a to the original target storage subsystem 108b. Hence, FIG. 5 depicts the original source storage subsystem 108a and the original target storage system 108b with the mirror operation 400 omitted to represent the termination of the copy relationship pairs of that mirror operation 400.

Furthermore, the swap operation which has been initiated (block 310) can include reestablishing the previously terminated copy relationships as replacement copy relationships of the target storage subsystem with associated replacement source storage units instead of the original source storage units. Thus, in one embodiment, the storage unit swap function can automatically reestablish the copy relationship pairs of the original mirror operation 400 (FIG. 4), as replacement copy relationship pairs of a replacement mirror operation 500 (FIG. 5) from the replacement source storage units to the original target storage units. Hence, FIG. 5 depicts the replacement source storage volumes 410e-410h and the original target storage volumes 410a-410d of the storage subsystem 108b with the replacement mirror operation 500 to represent the reestablishment of the copy relationship pairs which were terminated in connection with the original mirror operation 400 (FIG. 4), but are now reestablished in connection with the replacement mirror operation 500 from the replacement source storage volumes to the original target storage volumes of the subsystem 108b (FIG. 5).

As previously mentioned, the storage unit replacement operation which has been initiated (block 310) includes copying (block 320) the original source storage unit in a point-in-time snap copy, to a replacement storage unit. In the illustrated embodiment, a point-in-time snap copy operation includes establishing a point-in-time snap copy relationship such as the second copy relationship 160a (FIG. 1), between the original storage unit and the replacement storage unit.

As noted above, in a typical point-in-time snap copy operation, actual copying of the point-in-time data from one storage unit to another storage unit is frequently performed in a background operation once the point-in-time snap copy relationship has been established. In accordance with one aspect of the present description, a replacement storage unit which is the point-time-snap copy of the original source storage unit, may be swapped (block 330) for the original storage unit in input/output operations issued by at least one host, immediately once the point-in-time snap copy relationship has been established. Thus, the swap may be completed without waiting for background copying to start or be completed.

As previously mentioned, in one embodiment, data structures such as storage Unit Control Blocks (UCBs) 170a (FIG. 1) may be read by a host to identify a network path to the original storage volume for the input/output operations issued by the host. Accordingly, in such embodiments, a storage unit swap may be readily achieved by modifying the appropriate data structure such as a UCB which is read by a host to identify a network path to the replacement storage volume for the input/output operations issued by the host, instead of the original storage volume. Thus, in some embodiments, a swap may take place in a manner transparent to the host such that the host may not detect that the storage unit being accessed by the I/O operations has changed.

Accordingly, upon competition of the swap (block 330), subsequent I/O operations are directed (block 350) to the replacement source storage unit instead of to the original source storage unit. In those embodiments in which the I/O operations were quiesced prior to the snap copy (block 320) and the storage unit swap (block 330), the I/O operations may be unquiesced to resume (block 350) the I/O operations. Also, I/O operations may be resumed without waiting for background copying to start or be completed in connection with the point-in-time snap copy (block 320).

FIG. 4 depicts an example of a point-in-time snap copy operation 440 copying data from original volumes of the storage 106a of the original source storage subsystem 108a to replacement volumes of the same storage 106a of the original source storage subsystem 108b. In the illustrated embodiment, the point-in-time snap copying of data stored in the original source storage subsystem includes point-in-time snap copying of data from volumes 410a-410d of the storage 106a of the original source storage subsystem 108a to corresponding volumes 410e-410h, respectively, of the storage 106a of the original source storage subsystem 108a, in point-in-time snap copying relationships such as the copy relationship 160a of FIG. 1, with associated storage units such as volumes 410a-410d of the original source storage subsystem 108a. Thus, in this example, the point-in-time snap copy operation 440 copies data from a source volume 410a (a primary volume), for example, of the storage control unit 104a of the storage subsystem 108a, to a replacement source volume 410e, for example, of the storage control unit 104a of the storage subsystem 108a, pursuant to a point-in-time snap copy relationship which includes the volume pair of the source volume 410a and the replacement source volume 410e.

However, once the point-in-time snap copy relationship has been established between source volume 410a and replacement source volume 410e, the replacement source volume 410e may immediately be swapped (block 330) for the original storage volume 410a in input/output operations issued by at least one host, without waiting for background copying to start or be completed. Furthermore, I/O operations may be unquiesced to resume (block 350) I/O operations except that I/O operations are directed to the replacement source volume 410e instead of to the original source volume 410a, again without waiting for background copying to start or be completed.

The source volumes 410b-410d may similarly be point-in-time snap copied (block 320) to the replacement volumes 410f-410h, respectively, pursuant to associated point-in-time snap copy relationships which includes the volume pair of the source volume of the source volumes 410b-410d, and the replacement source volume of the replacement source volume of the replacement source volumes 410f-410h, respectively. In a similar manner, once the associated point-in-time snap copy relationship has been established between a source volume of the source volumes 410b-410d, and the associated replacement source volume of the replacement source volumes 410f-410h, respectively, the source volume and its associated replacement source volume may immediately be swapped (block 330) for the original storage volume in input/output operations issued by at least one host, without waiting for background copying to start or be completed. Furthermore, I/O operations may be unquiesced to resume (block 350) I/O operations except that I/O operations are directed to the replacement source volume of the replacement source volumes 410f-410h instead of to the original source volume of the source volumes 410b-410d, again without waiting for background copying to start or be completed.

The swap operation (block 350) may be completed so that I/O operations once resumed, are directed to the replacement source storage volumes 410e-410h instead of to the original source storage volumes 410a-410d of storage subsystem 108a. Because I/O operations at the host or hosts were quiesced prior to swapping to the replacement source storage subsystem, it is appreciated that when the relationship from the replacement source storage subsystem to the original target storage subsystem is established, that the data of the replacement source storage is logically the same as that of the original target storage subsystem. Hence, the relationships for the mirror operation from the replacement storage volumes to the original target storage volumes may be established in a 'no copy' operation such that copying from the replacement storage subsystem as a part of the setup may be fully or at least partially avoided. It is further noted that in embodiments in which I/O operations are quiesced, that the order of the point-in-time snap copy and the swap operations are interchangeable.

Once the replacement copy relationship pairs have been established and the swap completed, the I/O operations may resume (block 350) so that the storage subsystems mirror (arrows 500, FIG. 5) data from the replacement storage units to storage units of the original target storage subsystem in the reestablished copy relationships with associated replacement storage units. Thus, any new data writes to the replacement storage volumes will be mirrored to the original target storage volumes of the subsystem 108b pursuant to the mirror operation (arrows 500, FIG. 5). It is noted that if mirroring should be unable to start for various reasons such as a problem in the path, that I/O operations may nonetheless resume. Should there be an interruption in mirroring, the mirroring operations may subsequently catch up and become current using, for example, an incremental copy between the replacement storage volume and the original target storage volume. Furthermore, although this example of a replacement operation includes mirroring, it is appreciated that volume replacement operations utilizing a point-in-time snap copy and swapping may be utilized in other operations which do not include mirroring operations. Accordingly, replacement operations in accordance with the present description may be utilized to migrate a volume to any new logical control unit with a system such as the system 108a, for example.

In this mirroring example, mirror operations 500 may be reestablished to the original target storage volumes 410a-410d of the storage 106b as shown in FIG. 5. Accordingly, any updates to the replacement source storage volumes 410e-410h of the primary storage subsystem 108a are mirrored over to the original target storage volumes 410a-410d of the storage 106b of the secondary storage subsystem 108b in response to ongoing I/O operations. Background copying of data from the original source storage volumes 410a-410d of the storage 106a of the original source storage subsystem 108a to corresponding replacement source storage volumes 410e-410h, respectively, of the storage 106a of the original source storage subsystem 108a, pursuant to the point-in-time snap copying relationships continues until all the data of the original source storage volumes 410a-410d of the storage 106a of the original source storage subsystem 108a, to the corresponding replacement source storage volumes 410e-410h the original source storage subsystem 108a, has been copied. Once background copying has been completed, the point-in-time snap copying relationships may be terminated. It is appreciated that in some embodiments, background copying may avoided or terminated prior to completion as discussed above.

FIGS. 4, 5 depicts four point-in-time snap copy relationship pairs. However, it is appreciated that in a point-in-time snap copy relationship in a typical commercial setting, such point-in-time snap copy relationship pairs may number in the tens, hundreds, thousands or more.

Should a failure occur at any time during the overall storage unit swapping process depicted in FIGS. 3, 4, and 5, provision may be made for recovery from such a failure event without loss of data or a long interruption in I/O operations. For example, if a failure occurs in the original source storage volumes 410a-410d of the subsystem 108a before the replacement operation is initiated (block 310), a multi-storage volume swap capability such as HyperSwap® may switch I/O operations to the secondary storage subsystem which is the original target storage subsystem 108b in this example. The original target storage subsystem 108b is at full duplex with respect to the original source storage volumes of the subsystem 108a due to the ongoing mirror operations (arrows 400, FIG. 4) to reduce or eliminate the likelihood of data loss due to a failure of the original source storage subsystem 108a.

Conversely, if a failure occurs in the replacement storage volumes of the subsystem 108a once the swap is complete (block 350), a multi-storage volume swap capability such as HyperSwap® may switch I/O operations from the replacement storage volumes of the subsystem 108a to the secondary storage subsystem which, again, is the original target storage subsystem 108b, in this example.

In the illustrated embodiment, the storage unit replacement operation (blocks 310-350) may be configured to proceed in a fully automatic fashion with no user input such that the storage unit replacement operation may proceed very quickly. As a result, the likelihood of a failure of the original source storage volumes or the replacement source storage volumes of the subsystem 108a during the replacement operation (blocks 310-350) may be quite small. However, as explained in greater detail below, I/O operations may be quiesced during the storage unit replacement operation (blocks 310-350) to reduce or eliminate the chance of data loss in the unlikely event of a failure during the storage unit swap operation (blocks 310-350). It is appreciated that in some embodiments, quiescing may be avoided, particularly in circumstances where additional I/O operations are impeded by other factors such as loss of all links to the hosts, for example.

In one embodiment, a storage subsystem may have a separate storage control unit for controlling access to the storage units of the particular storage subsystem. However, it is appreciated that in other embodiments, a storage control unit may be shared amongst one or more storage subsystems, for controlling access to various storage units of the storage subsystems. Thus, storage units of the original source storage subsystem and a replacement storage subsystem, for example, may share a storage control unit and be controlled by the shared storage control unit.

Figure 6:
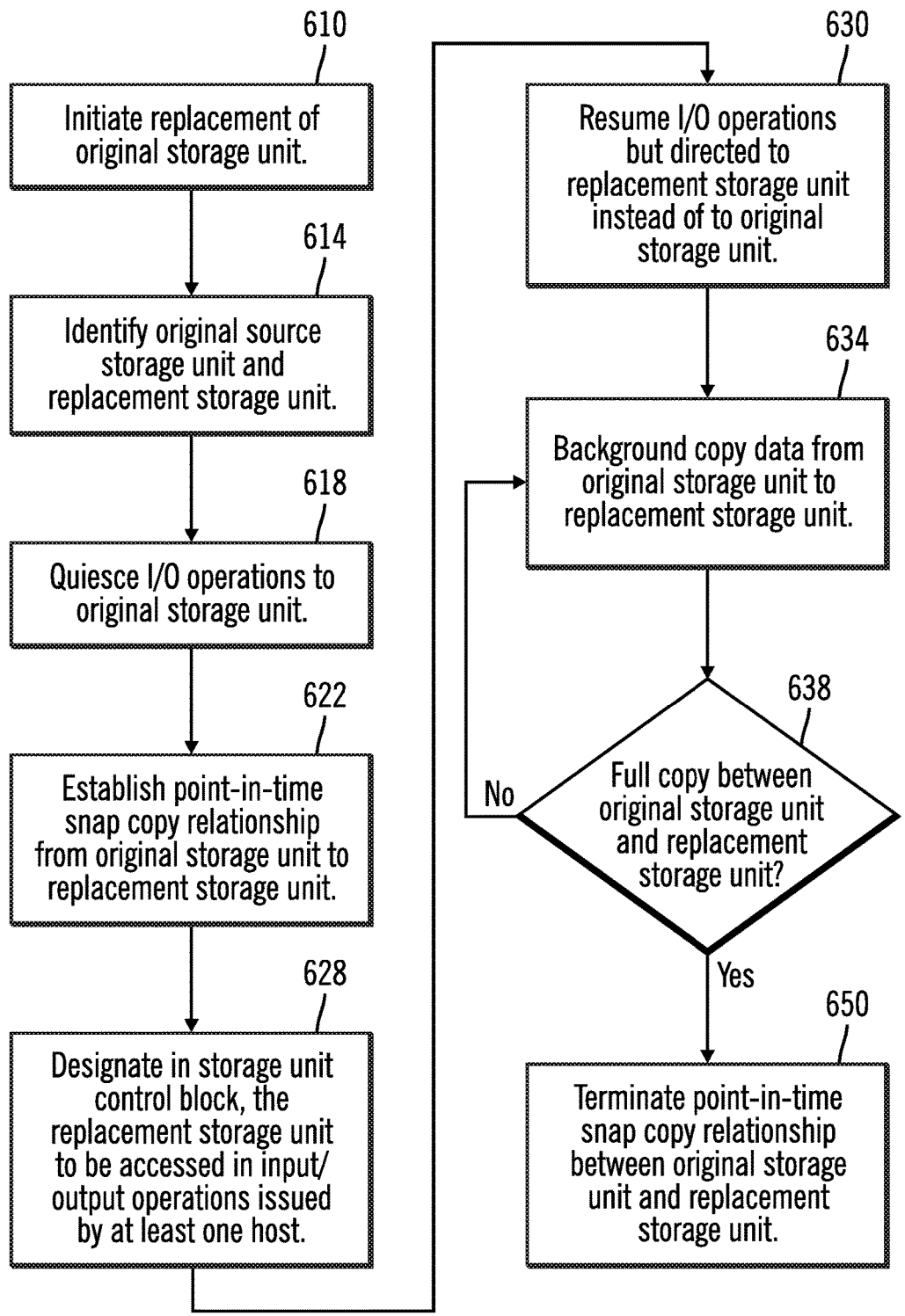
FIG. 6 illustrates another embodiment of operations to replace a storage unit using a point-in-time snap copy operation and a storage unit swap in accordance with one embodiment of the present description.

FIG. 6 illustrates another example of operations of a networked storage system in which a storage unit replacement is performed in accordance with one embodiment of the present description. In this example, like that of the example of FIG. 1, an original source storage subsystem such as the storage subsystem 108a (FIG. 2), for example, is accessed in input/output operations issued by at least one host such as one of the hosts 114. In one embodiment, any data stored and any updates to that data in the original source storage subsystem, may be mirrored from the original source storage subsystem to an original target storage subsystem. However, in other embodiments, such a mirror operation may be omitted, depending upon the particular application.

In this example, a replacement of an original storage unit is initiated (block 610). In one embodiment, the replacement may be initiated by a command issued to copy services management software of the storage management to replace the source storage unit. For example, when all the mirror copy relationship pairs of the mirror operation (such as the mirror operation 400, FIG. 4) are at full duplex status and the mirror copy session is in a prepared state, a command such as a "Change Source" command may become available to the user to change the source from the original source storage unit to a replacement storage unit of the subsystem. Thus, a storage unit replacement including a storage unit swap function may be initiated by a human operator. In another embodiment, the storage management may automatically initiate the storage unit replacement to change the source from the original source storage unit to the replacement storage unit. Thus, the command may be issued by a human operator or may be triggered automatically by some event, such as detection of a degradation in performance of the original source storage volumes of the storage subsystem, for example.

In one embodiment, a swap of a replacement storage unit such as a storage volume for an original source storage volume may be done fully automatically without the need for human intervention. For example, in applications in which storage systems or subsystems are monitored for system performance, such as IBM's z/OS Workload Manager (WLM), for example, the existence of a performance problem may be detected and the problem addressed by moving a source from one volume to another volume, typically in the same storage subsystem, and the WLM could be modified in accordance with the present description to initiate the replacement.

In another operation, upon initiation (block 610) of the replacement operation, an original source storage unit to be replaced, and a replacement source storage unit to replace the original source storage unit may be identified (block 614) to a storage unit swap manager. In one embodiment, the original source storage unit to be replaced may be identified by the operator. In another embodiment, an original source storage unit to be replaced may be identified automatically with little or no human operator intervention. For example, a workload manager may automatically identify performance problems in one or more original source storage units, and automatically identify those particular storage units for replacement. In another embodiment, a command to initiate storage unit replacement may include an identification of the particular storage units to be replaced. In another embodiment, management software can, in response to a command to initiate replacement of storage units, automatically identify a list of candidate source storage units for replacement, and in a suitable user interface, present the list of candidate source storage units for replacement to a human operator. In response, the human operator may select a suitable source storage unit from the list of candidate source storage units to be replaced. In yet another embodiment, candidate original source storage units for replacement may already be defined as being managed by the storage management software.

Similarly, in one embodiment, the replacement source storage unit may be identified by the operator. In another embodiment, a suitable replacement source storage unit may be identified automatically with little or no human operator intervention. For example, copy management software can, in response to a command to initiate the replacement of a source storage unit, automatically identify a list of candidate replacement source storage units, and in a suitable user interface, present the list of candidate replacement source storage units to a human operator. In response, the human operator may select a suitable replacement source storage unit from the list of candidate replacement source storage units. In one embodiment, candidate replacement source storage subsystems may already be defined as being managed by the storage management software.

As used herein, the term "automatically" includes both fully automatic, that is operations performed by one or more software controlled machines with no human intervention such as user inputs to a graphical user interface. As used herein, the term "automatically" further includes predominantly automatic, that is, most of the operations (such as greater than 50%, for example) are performed by one or more software controlled machines with no human intervention such as user inputs to a graphical user interface, and the remainder of the operations (less than 50%, for example). are performed manually, that is, the manual operations are performed by one or more software controlled machines with human intervention such as user inputs to a graphical user interface to direct the performance of the operations.

Thus, in the example above, the copy management software can fully automatically identify a list of candidate replacement source storage units, and in a suitable user interface, present the list of candidate replacement source storage units to a human operator. In response, the human operator may select a suitable replacement source storage units from the list of candidate replacement source storage units. In this manner, the replacement source storage units may be identified (block 614) in a predominantly automatic fashion. In other embodiments, the replacement source storage units may be identified (block 614) fully automatically, that is, without human intervention, or may be identified, manually by a human operator and the selection manually input into a graphical user interface. Unlike a conventional Hyperswap function, there may be no preexisting copy relationship between the original source storage unit and the replacement source storage unit identified to replace the original source storage unit.

Upon identification (block 614) of a source storage unit to be replaced and a suitable replacement source storage unit to replace the original source storage unit, I/O operations to the original source storage unit may be quiesced (block 618) and a point-in-time snap copy relationship may be automatically established (block 622) from the original source storage unit to the replacement source storage unit. If there is a mirroring operation from the original source storage unit to be replaced, to an original target storage unit, the copy relationship between the original source storage unit and the original target storage unit may be terminated, either automatically or manually.

In this manner, I/O operations from the hosts 114 to the original source storage unit are quiesced (block 618) in anticipation of or as a part of the storage unit swap function which includes the establishing (block 622) of a point-in-time snap copy relationship from the identified original storage unit to the identified replacement storage unit. In one embodiment, the storage management can automatically issue a quiesce I/O operations command once the original source storage unit and its replacement storage unit are identified. For example, a storage unit swap command automatically issued by the storage management may be a HyperSwap® with Quiesce command modified in accordance with the present description, to temporarily quiesce I/O operations while the storage unit swap is taking place. In one embodiment, the I/O operations which have already started when the storage unit swap is initiated, may be permitted to complete. Any subsequent I/O operations may be placed in a queue at the originating host to await completion of the replacement storage volume swap operation. It is appreciated that in other embodiments, the quiescing of the I/O operations may be performed manually.

Once I/O operations have been quiesced, the storage unit swap operation continues with the establishment (block 622) of the point-in-time snap copy relationship from the identified original storage unit to the replacement storage unit. In one embodiment, the storage management can automatically issue a point-in-time snap copy relationship establish command. Accordingly, in the illustrated embodiment, a point-in-time snap copy relationship from the original source storage unit to the replacement source storage unit may be automatically initiated once the copy relationship pair of the original source storage unit and the replacement source storage unit have been identified and I/O operations have been quiesced.

In one embodiment, a multi-storage volume swap function such as HyperSwap® may be modified in accordance with the present description to provide a storage unit swap from the original source storage unit to the replacement source storage unit. In this embodiment, the HyperSwap® function is modified for use in facilitating a storage unit swap within a particular storage subsystem. However, it is appreciated that a storage unit swap in accordance with the present description may be used in connection with a storage unit swap between various storage subsystems, depending upon the particular application.

A disaster recovery capability provided by use of a multi-storage volume swap capability may, in some embodiments, be optionally provided between the volumes in the original copy relationship, that is, between the original source storage volumes of the original source storage subsystem 108a and the original target storage volumes of the original target storage subsystem 108b if appropriate. Thus, a capability to swap an original source storage volume and the original target storage volume to access the original target storage volume instead of the original source storage volume, in input/output operations issued by at least one host, in the event of a failure at the original source storage volume or subsystem may be maintained, prior to performing the storage unit swap replacing an original source storage unit with a replacement storage unit.

In the illustrated embodiment, if a mirror relationship had been established between the original source storage units and the original target storage units, a copy relationship between the replacement source storage unit and the original target storage unit may be established, either automatically or manually.

Thus, a multi-storage swap function such as HyperSwap® modified in accordance with the present description to facilitate a storage unit replacement, may automatically establish the replacement copy services relationships between the new replacement source volumes and the original target volumes, with a no copy option, for example. It is appreciated that in other embodiments, one or more of the copy relationships may be manually terminated or manually reestablished in connection with the swap of source storage units. Since the original target storage units of the original target storage subsystem are already a full copy of the point-in-time snap copy replacement source storage units, a full copy operation is not needed to prepare for mirroring from the replacement storage units to the original target storage subsystem once I/O operations resume.

In another operation, once the point-in-time snap copy relationship from original storage unit to the replacement storage unit has been established (block 622), paths from the hosts to the original source storage units of the original source storage subsystem may be automatically swapped (block 628) to the replacement source storage units of that subsystem so that I/O operations from the hosts are swapped so that I/O operations once resumed are to be redirected to the replacement source storage units instead of to the original source storage units. In one embodiment, such storage unit swapping may be achieved by designating (block 628) in a storage unit control block, the replacement storage unit to be accessed in input/output operations issued by at least one host.

In one embodiment, such designating may include modifying appropriate data structures such as storage Unit Control Blocks (UCBs) 170a (FIG. 1) which identify the storage locations of the primary and secondary storage subsystems, the status of such storage subsystem locations, and the network path to the particular storage locations of the storage subsystems. Thus, for example, a UCB identifying storage locations of the original source storage unit of the subsystem 108a may be modified to designate those replacement storage locations of the source storage subsystem 108a as the primary storage locations for the I/O operations from the hosts and as the source locations for a mirroring operation. For example, in one embodiment, the contents of the UCB that represents the original source may be swapped with the contents of the UCB of the replacement, such that the UCB originally pointing to the original source now points to the replacement, and the UCB originally pointing to the replacement now points to the original source. It is appreciated that in other embodiments, paths from the hosts to the original source storage units of the storage subsystem may be manually swapped to the replacement source storage units of the subsystem.

Although the Unit Control Blocks (UCBs) 170a (FIG. 1) of the multi-storage volume swap manager 140a are depicted as part of the operations of a host, it is appreciated that in some embodiments, designation of the replacement storage unit to be accessed by the input/output operations issued by at least one host, instead of the original storage unit, may be performed by a storage control unit. Hence, in some embodiments, swapping of a replacement storage unit and an original storage unit may be performed in a manner which is transparent to the host issuing input/output operations. Thus, in such embodiments, the host need not designate the replacement storage unit to be accessed by its input/output operations instead of the original storage unit.

Once the replacement storage unit has been designated (block 628), the storage unit swap operation may then allow I/O operations to automatically resume (block 630), but directed to the replacement storage unit instead of to the original source storage unit of the subsystem 108a. Any new data writes to the replacement storage unit of the storage subsystem 108a may be mirrored to the original target storage subsystem 108b in accordance with the copy relationships established between the replacement storage unit and the original target storage unit of the subsystem 108b. It is appreciated that in other embodiments, I/O operations may be manually resumed in connection with the swap.

In the illustrated embodiment, a point-in-time snap copy takes place upon establishment of the point-in-time snap copy relationship between the original source storage unit and the replacement storage unit. However, the actual transfer of data from the original source storage unit to the replacement source storage unit occurs in a background copy operation (block 634). If a host directs a read operation to read data from the replacement source storage unit but the target data of that read operation has not yet been copied to the replacement source storage unit, the storage controller redirects the read operation to the original source storage unit instead of to the replacement source storage unit.

A determination is made (block 638) as to whether the background copy operation (block 634) has achieved a full copy of the original source storage unit. If so, the point-in-time snap copy relationship between the original source storage unit and the replacement source storage unit may be terminated (block 650). If not, background copying continues (block 634) until the full copy has been achieved. If an input/output operation by a host writes data to the replacement source storage unit before the background copy has copied the data for those storage locations from the original source storage unit, the background copy for those storage locations of the replacement source storage unit is skipped so that the new data written to those storage locations of the replacement source storage unit is not overwritten by the background copy operation.

It is seen from the above that storage management in accordance with the present description can provide a facilitated and in some embodiments, an automated process to replace a storage unit in a swap which can reduce or eliminate disruptions to I/O operations. In addition, the swap may be performed maintaining disaster recovery capability. As a result, it is believed that users will be able to quickly replace a storage unit in situations where it may have previously been impractical, such as for example dealing with a performance problem while business work is being executed. It is appreciated that in some embodiments, a host may receive permanent I/O errors in connection with a volume, while the volume is still fully functional. For example, if some of the paths to the volume were lost, the data of the volume may be moved to another logical control unit (LCU) or other storage in the storage control unit 108a where a suitable number of functional paths are still maintained. Thus, in some cases it is appreciated that some but not all paths may be lost, thereby reducing bandwidth and adversely affecting performance. As a result, moving the volume may improve bandwidth or performance.

As previously mentioned, in one embodiment, a volume may be replaced by a volume controlled by the same storage control unit, using a storage unit swap function. In another embodiment, a volume may be replaced by a volume controlled by a different storage control unit, using a storage unit swap function. For example, I/O errors continue after an initial replacement of a storage unit within a single storage subsystem, the storage unit may be replaced using a replacement storage unit in a different storage subsystem.

Figure 7:
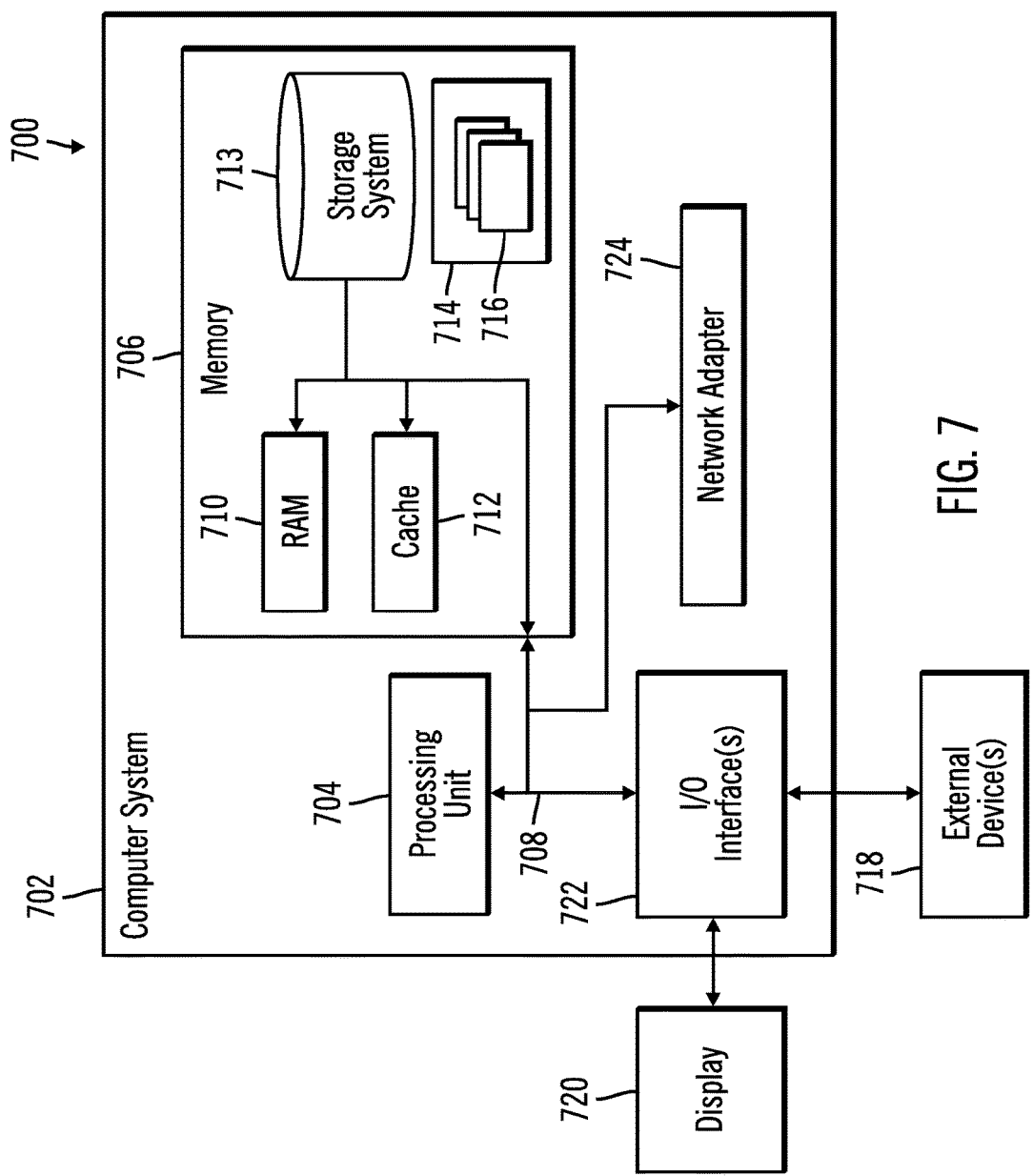
FIG. 7 illustrates one node of a network computing environment, employing a storage unit swap in accordance with one embodiment of the present description.

FIG. 7 illustrates one embodiment of a node 700 of a distributed computing system such a host, application server, storage controller, server or virtual server, of the storage area network 102 of FIG. 2. However, it is appreciated that the node 700 of FIG. 7 may comprise any suitable computing device 702, such as a mainframe, server, personal computer, laptop, handheld computer, telephony device, network appliance, virtualization device, storage controller, failover lock device, embedded device, etc.

It is appreciated that the nodes of a distributed computing system may perform a variety of data processing functions such as data storage and management in disk arrays, for example. Thus, the node of FIG. 7 may perform data processing tasks such as data backup, data deduplication, data mining data capture, data archiving, data replication, bandwidth reduced data replication, encryption of data, etc. and typically involve the transfer of large amounts of data between the hosts 114 and storage 106a, 106b (FIG. 2).

The node 700 may perform storage unit replacement in accordance with one or more embodiments described herein.

The node may include a processor 704 (e.g., a microprocessor), a memory 706 (e.g., a volatile memory device 710), bus 708, cache 712, and storage 713 (e.g., a non-volatile storage, such as magnetic disk drives, optical disk drives, a tape drive, flash storage etc.). A storage 714 may comprise an internal storage device or an attached or network accessible storage. Programs 716 in the storage 714 are loaded into the memory 710 and executed by the processor 704 as represented by an operating system and data processing programs 716.

Programs 716 are also provided in the memory 704 for data migration management in accordance with the present description.

The node further includes a network controller or adapter 724 to enable communication with a network such as an Ethernet, a Fibre Channel Arbitrated Loop, etc. which interconnects the nodes of the distributed computing system. The network controller or adapter 724 may also enable communication with a network path to a host 114 or communication with a network path to storage 106.

User input devices 718 provide user input to the processor 704, and may include a keyboard, mouse, pen-stylus, microphone, touch sensitive display screen, or any other suitable activation or input mechanism. Output devices 720 are capable of rendering information transmitted from the processor 704, or other component, such as a display monitor, printer, storage, etc. The input devices 718, and output devices 720 may be coupled directly to a node using a suitable KVM (keyboard, video, mouse) switch 722 in some applications.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to limit to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A method, comprising:

copying data from a source storage subsystem to a target storage subsystem;

accessing storage locations of an original storage unit of the source storage subsystem in response to received input/output operations issued by at least one host, wherein the accessing includes at least one of writing updates to and reading data from the storage location being accessed;

creating in the source storage subsystem a point-in-time snap copy of the original storage unit of the source storage subsystem as a replacement storage unit of storage locations in the source storage subsystem; and replacing the original storage unit of the source storage subsystem with the replacement storage unit of storage locations in the source storage subsystem, including:

initiating accessing storage locations of the replacement storage unit of the source storage subsystem instead of storage locations of the original storage unit of the source storage subsystem, in response to received input/output operations issued by at least one host, wherein the accessing includes writing updates to and reading data from the storage location of the replacement storage unit of the source storage subsystem being accessed; and copying data from storage locations of the original storage unit to storage locations of the replacement storage unit of the source storage subsystem after initiation of the accessing of storage locations of the replacement storage unit.

2. The method of claim 1, wherein the copying data from storage locations of the original storage unit to storage locations of the replacement storage unit includes background copying data from storage locations of the original storage unit to storage locations of the replacement storage unit after initiation of the accessing of storage locations of the replacement storage unit instead of storage locations of the original source storage unit.

3. The method of claim 1 further comprising swapping the replacement storage unit for the original source storage unit wherein the swapping includes quiescing input/output operations to the original source storage unit.

4. The method of claim 3 wherein the swapping includes a swap manager maintaining a data structure identifying a storage unit to be accessed by the input/output operations issued by at least one host to access storage locations of the identified storage unit, and wherein the accessing of storage locations of the original source storage unit in response to received input/output operations includes at least one of writing updates to and reading data from storage locations of the original source storage unit identified by the data structure maintained by the swap manager.

5. The method of claim 4 wherein the swapping includes the swap manager modifying a data structure to identify the replacement storage unit instead of the original storage unit to be accessed by the input/output operations issued by the at least one host so that storage locations of the replacement storage unit are accessed instead of storage locations of the original source storage unit, in response to received input/output operations.

6. The method of claim 2 wherein the creating a point-in-time snap copy of the original storage unit as a replacement storage unit of storage locations includes creating a point-in-time snap copy relationship between the storage locations of the original storage unit and the storage locations of the replacement storage unit.

7. The method of claim 6 further comprising determining when the background copying of data from storage locations of the original storage unit to storage locations of the replacement storage unit is completed and terminating the point-in-time snap copy relationship between the storage locations of the original storage unit and the storage locations of the replacement storage unit upon completion of the background copying of data from storage locations of the original storage unit to storage locations of the replacement storage unit.

8. The method of claim 1 further comprising quiescing the accessing of storage locations of an original source storage unit in response to received input/output operations, before creating the point-in-time snap copy of the original storage unit as a replacement storage unit of storage locations.

9. The method of claim 8 wherein the quiescing includes queuing input/output operations in a queue and wherein the initiating of accessing of storage locations of the replacement storage unit instead of storage locations of the original source storage unit, in response to received input/output operations includes performing the input/output operations queued in the queue wherein the replacement storage unit is accessed instead of the original storage unit in the queued input/output operations and at least one of updates are written to and data read from storage locations of the replacement storage unit.

10. A system for use with a host, comprising:
at least one source storage subsystem including a plurality of original source storage units, at least one target storage subsystem including a plurality of original target storage units, said at least one source storage subsystem further including a plurality of replacement source storage units and at least one storage controller adapted to access and control storage units of the at least one storage subsystem; and
at least one computer readable storage medium having computer readable program code embodied therein that is enabled to cause operations to be performed, the operations comprising:
copying data from the source storage subsystem to the target storage subsystem;
accessing storage locations of an original storage unit of the source storage subsystem in response to received input/output operations issued by at least one host, wherein the accessing includes at least one of writing updates to and reading data from the storage location being accessed;
creating in the source storage subsystem a point-in-time snap copy of the original storage unit of the source storage subsystem as a replacement storage unit of storage locations in the source storage subsystem; and
replacing the original storage unit of the source storage subsystem with the replacement storage unit of storage locations in the source storage subsystem, including:
initiating accessing storage locations of the replacement storage unit of the source storage subsystem instead of storage locations of the original storage unit of the source storage subsystem, in response to received input/output operations, wherein the accessing includes writing updates to and reading data from the storage location of the replacement storage unit of the source storage subsystem being accessed; and
copying data from storage locations of the original storage unit to storage locations of the replacement storage unit of the source storage subsystem after initiation of the accessing of storage locations of the replacement storage unit.

11. The system of claim 10, wherein the copying data from storage locations of the original storage unit to storage locations of the replacement storage unit includes background copying data from storage locations of the original storage unit to storage locations of the replacement storage unit after initiation of the accessing of storage locations of the replacement storage units instead of storage locations of the original source storage units.

12. The system of claim 10 wherein the operations further comprise swapping the replacement storage unit for the original source storage unit wherein the swapping includes quiescing input/output operations to the original source storage unit.

13. The system of claim 12 wherein the swapping includes a swap manager maintaining a data structure identifying a storage unit to be accessed by the input/output operations issued by at least one host to access storage locations of the identified storage unit, and wherein the accessing of storage locations of the original source storage unit in response to received input/output operations includes at least one of writing updates to and reading data from storage locations of the original source storage unit identified by the data structure maintained by the swap manager.

14. The system of claim 13 wherein the swapping includes the swap manager modifying a data structure to identify the replacement storage unit instead of the original storage unit to be accessed by the input/output operations issued by the at least one host so that storage locations of the replacement storage unit are accessed instead of storage locations of the original source storage unit, in response to received input/output operations.

15. The system of claim 11 wherein the creating a point-in-time snap copy of the original storage unit as a replacement storage unit of storage locations includes creating a point-in-time snap copy relationship between the storage locations of the original storage unit and the storage locations of the replacement storage unit.

16. The system of claim 15 wherein the operations further comprise determining when the background copying of data from storage locations of the original storage unit to storage locations of the replacement storage unit is completed and terminating the point-in-time snap copy relationship between the storage locations of the original storage unit and the storage locations of the replacement storage unit upon completion of the background copying of data from storage locations of the original storage unit to storage locations of the replacement storage unit.

17. The system of claim 10 wherein the operations further comprise quiescing the accessing of storage locations of an original source storage unit in response to received input/output operations, before creating the point-in-time snap copy of the original storage unit as a replacement storage unit of storage locations.

18. The system of claim 17 wherein the quiescing includes queuing input/output operations in a queue and wherein the initiating of accessing of storage locations of the replacement storage unit instead of storage locations of the original source storage unit, in response to received input/output operations includes performing the input/output operations queued in the queue wherein the replacement storage unit is accessed instead of the original storage unit in the queued input/output operations and at least one of updates are written to and data read from storage locations of the replacement storage unit.

19. A computer program product for managing data storage operations in connection with at least one source storage subsystem including a plurality of original source storage units, at least one target storage system including a plurality of original target storage units, said at least one source storage subsystem further including a plurality of replacement source storage units, and at least one storage controller adapted to access and control storage units of the at least one source storage subsystems, the computer program product comprising at least one non-transitory computer readable storage medium having computer readable program code embodied therein that is enabled to cause operations to be performed, the operations comprising:

copying data from a source storage subsystem to a target storage subsystem;

accessing storage locations of an original storage unit of the source storage subsystem in response to received input/output operations issued by at least one host, wherein the accessing includes at least one of writing updates to and reading data from the storage location being accessed;

creating in the source storage subsystem a point-in-time snap copy of the original storage unit of the source storage subsystem as a replacement storage unit of storage locations in the source storage subsystem; and replacing the original storage unit of the source storage subsystem with the replacement storage unit of storage locations in the source storage subsystem, including:

initiating accessing storage locations of the replacement storage unit of the source storage subsystem instead of storage locations of the original storage unit of the source storage subsystem, in response to received input/output operations, wherein the accessing includes at least one of writing updates to and reading data from the storage location of the replacement storage unit of the source storage subsystem being accessed; and copying data from storage locations of the original storage unit to storage locations of the replacement storage unit of the source storage subsystem after initiation of the accessing of storage locations of the replacement storage unit.

20. The product of claim 19, wherein the copying data from storage locations of the original storage unit to storage locations of the replacement storage unit includes background copying data from storage locations of the original storage unit to storage locations of the replacement storage unit after initiation of the accessing of storage locations of the replacement storage units instead of storage locations of the original source storage units.

21. The product of claim 20 wherein the operations further comprise swapping the replacement storage unit for the original source storage unit wherein the swapping includes quiescing input/output operations to the original source storage unit.

22. The product of claim 21 wherein the swapping includes a swap manager maintaining a data structure identifying a storage unit to be accessed by the input/output operations issued by at least one host to access storage locations of the identified storage unit, and wherein the accessing of storage locations of the original source storage unit in response to received input/output operations includes at least one of writing updates to and reading data from storage locations of the original source storage unit identified by the data structure maintained by the swap manager.

23. The product of claim 22 wherein the swapping includes the swap manager modifying a data structure to identify the replacement storage unit instead of the original storage unit to be accessed by the input/output operations issued by the at least one host so that storage locations of the replacement storage unit are accessed instead of storage locations of the original source storage unit, in response to received input/output operations;

wherein the creating a point-in-time snap copy of the original storage unit as a replacement storage unit of storage locations includes creating a point-in-time snap copy relationship between the storage locations of the original storage unit and the storage locations of the replacement storage unit;

wherein the operations further comprise determining when the background copying of data from storage locations of the original storage unit to storage locations of the replacement storage unit is completed and terminating the point-in-time snap copy relationship between the storage locations of the original storage unit and the storage locations of the replacement storage unit upon completion of the background copying of data from storage locations of the original storage unit to storage locations of the replacement storage unit;

wherein the operations further comprise quiescing the accessing of storage locations of an original source storage unit in response to received input/output operations, before creating the point-in-time snap copy of the original storage unit as a replacement storage unit of storage locations; and wherein the quiescing includes queuing input/output operations in a queue and wherein the initiating of accessing of storage locations of the replacement storage unit instead of storage locations of the original source storage unit, in response to received input/output operations includes performing the input/output operations queued in the queue wherein the replacement storage unit is accessed instead of the original storage unit in the queued input/output operations and at least one of updates are written to and data read from storage locations of the replacement storage unit.

* * * * *